Dec. 22, 1936.  W. H. JACKSON  2,065,312
ANTISKID DEVICE
Filed Dec. 6, 1934

Inventor
Walter H. Jackson

By Carl E. Ring & Robert F. Davis
Attorneys

UNITED STATES PATENT OFFICE 2,065,312

ANTISKID DEVICE

Walter H. Jackson, Summit, N. J.

Application December 6, 1934, Serial No. 756,346

1 Claim. (Cl. 152—14)

This invention relates to an improved anti-skid device to be applied to the wheels of automobiles and the like.

Numerous devices of this general class have been suggested but none are without unsatisfactory features. Of the difficulties that prevent the use with satisfaction of the known anti-skid devices, probably the most important is the rapidity with which the devices are worn away by contact with modern hard surface roads.

It is a purpose of the present invention to provide a simple anti-skid device in which this disadvantage is greatly lessened and which will withstand successfully long periods of fast driving on hard surfaced roads.

To accomplish this and other objects that will more fully appear from the following description, this invention provides an anti-skid device with a road contacting surface of unusual qualities. This surface is neither metal, rubber, nor fabric as such surfaces usually are but comprises a matrix of a soft metal, such as aluminum, in which is embedded small pieces of an exceptionally hard durable material such as carborundum.

Figure 1:
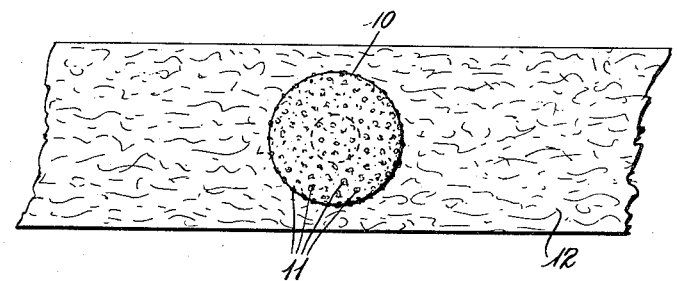
Figure 2:
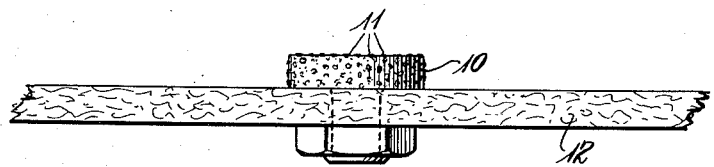

A more complete understanding of the invention may be obtained from the appended drawing and the following description thereof. In the drawing, Figure 1 is a plan view of a part of an anti-skid device constructed according to this invention; and Figure 2 is a sectional view of the same.

Although it is within the scope of this invention to use the new, long wearing, anti-skid material as the wearing surface for any type of anti-skid device, it has been found particularly advantageous in a device of the kind shown by the drawing. According to the drawing an aluminum matrix 10 has embedded therein numerous small pieces of carborundum 11 or a similar hard material. The aluminum matrix is supported in turn by a flexible member 12, such as a strap, that passes around the tire or wheel.

As a possible alternative, which is not illustrated, the ordinary tire chain comprised of a series of links may be made of the new wear resisting material or may be surfaced with such material.

Having thus described and illustrated the invention it is to be understood that the illustrations given in no way limit the application of the principles of the invention in the specific manner so disclosed but that the scope of this invention is limited only as indicated by the accompanying claim.

I claim:

An anti-skid device comprising a flexible base carrying a plurality of contacting surfaces at least part of which comprise a plurality of small pieces of a hard material such as carborundum imbedded in an aluminum matrix.

WALTER H. JACKSON.